(No Model.)

J. B. PAYNE.
BRAKE FOR TRAMWAY CARS.

No. 563,795.    Patented July 14, 1896.

WITNESS:
C. B. Larson
C. Gerst

INVENTOR
Jonas B. Payne
BY
Edgar Tate & Co
ATTORNEYS.

THE NORRIS PETERS CO., PHOTO-LITHO., WASHINGTON, D. C.

UNITED STATES PATENT OFFICE.

JONAS BOWERS PAYNE, OF SMITHTOWN, NEW YORK.

BRAKE FOR TRAMWAY-CARS.

SPECIFICATION forming part of Letters Patent No. 563,795, dated July 14, 1896.

Application filed April 8, 1896. Serial No. 586,681. (No model.)

*To all whom it may concern:*

Be it known that I, JONAS BOWERS PAYNE, a citizen of the United States, and a resident of Smithtown, in the county of Suffolk and State of New York, have invented certain new and useful Improvements in Brakes for Tramway-Cars, of which the following is a specification, reference being had to the accompanying drawings, forming a part thereof, in which similar letters of reference indicate corresponding parts.

This invention relates to brakes for tramway-cars; and the object thereof is to provide an improved device of this class which is adapted to be operated from either platform of the car, and which comprises a combination of brake-bars and brake-shoes connected therewith which are adapted to operate upon the wheels of the car and a clutch mechanism which is connected with the truck and one of the axles, said devices being adapted to be operated jointly.

The invention is fully disclosed in the following specification, of which the accompanying drawings form a part, in which—

Figure 1:
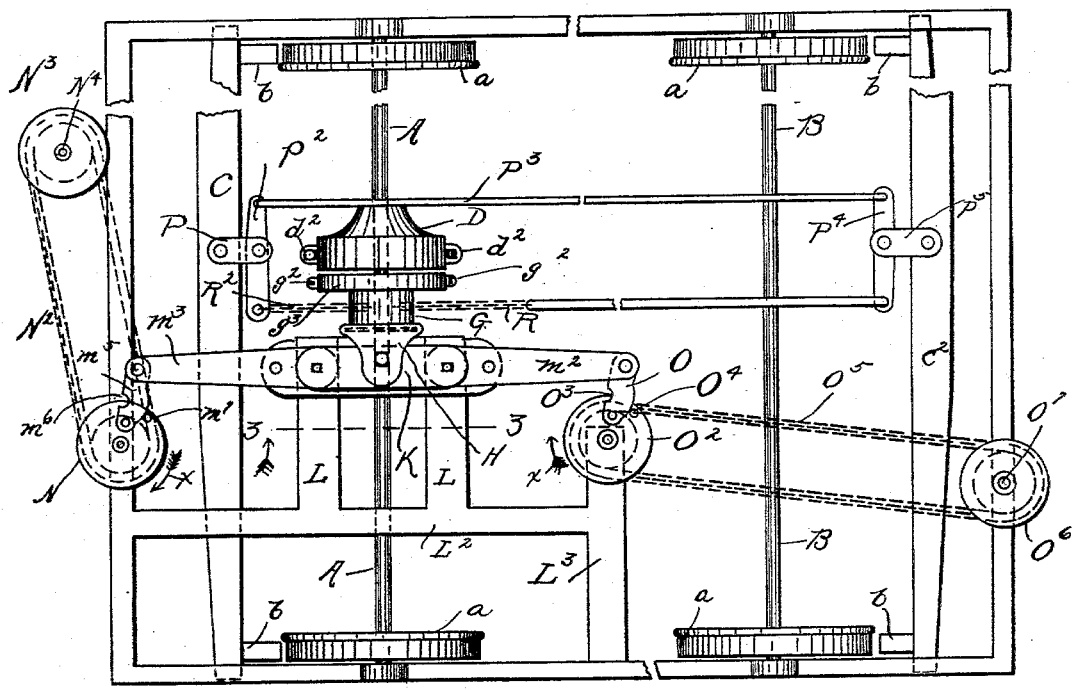
Figure 2:
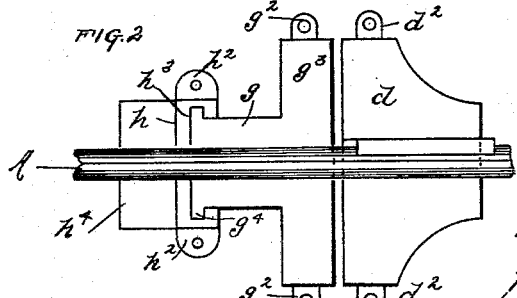
Figure 4:
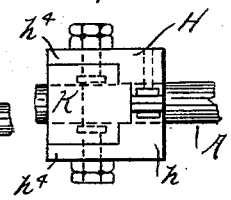
Figure 5:
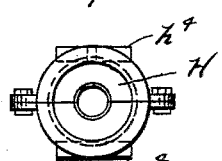
Figure 3:
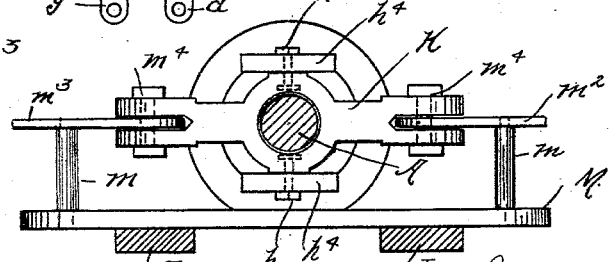

Figure 1 is a plan view of the truck of a car, and showing my improved brake apparatus connected therewith; Fig. 2, a side view of the part of the mechanism which is connected with one of the axles; Fig. 3, a section on the line 3 3 of Fig. 1; and Figs. 4 and 5 are side and end views, respectively, of a detail of the construction, Fig. 5 being on a reduced scale.

In the drawings forming part of this specification, A and B represent the axles of a car-truck, and $a$ the usual wheels which are mounted thereon, and pivotally suspended therefrom in the usual manner are the brake-bars C and $C^2$, which are provided at each end with brake-shoes $b$.

The axle A is provided with a clutch mechanism, which comprises the following construction: A clutch-head D, which is composed of two equal parts $d$, each of which is provided with shoulders or projections $d^2$, by which they are secured together, is mounted on the axle and revolves therewith, and mounted on said axle adjacent to said clutch-head is a sliding clutch-sleeve G, which consists of two parts $g$, each of which is provided with shoulders or projections $g^2$, by which they are secured together, and when thus secured together the clutch-sleeve G is provided with a circular head $g^3$, and mounted on the axle adjacent to the clutch-sleeve G is a collar H, which is also composed of two parts $h$, provided with shoulders or projections $h^2$, by which they are secured together, and said collar is provided with an annular chamber or recess $h^3$, which is adapted to receive an annular flange or rim $g^4$, formed on the clutch-sleeve G. These features of the construction are best shown in Figs. 1, 2, 4, and 5, and the collar H is provided with projecting jaws $h^4$, which are adapted to inclose the central portion of a lever K, and to be pivotally connected therewith by means of bolts $k$, and the lever K is mounted on the axle A, as clearly shown in Figs. 2 and 3, and connected with the truck-frame is a support comprising plates or bars L, $L^2$, and $L^3$, and mounted on the plates or bars L is a transverse plate M, at each end of which are vertical standards $m$, and pivotally connected with the vertical standards $m$ are levers $m^2$ and $m^3$, and the inner ends of the levers $m^2$ and $m^3$ are pivotally connected with the ends of the lever K, as shown at $m^4$.

The outer end of the lever $m^3$ is provided with a pivoted arm $m^5$, which is pivotally connected with a wheel or pulley N near one side thereof, and formed in the outer side of the pivoted arm $m^5$ is a semicircular notch or recess $m^6$, which is adapted to operate in connection with a pin or projection $m^7$ on the pulley N, and mounted on the pulley N is a cord, chain, or belt $N^2$, which passes around a pulley $N^3$, which is mounted on a rod or shaft $N^4$, which extends upwardly through the platform, and is adapted to be operated therefrom, and the outer end of the lever $m^2$ is provided with a pivoted arm O, which is pivotally connected with a pulley $O^2$, and which is provided on its inner side with a semicircular cavity or recess $O^3$, which is adapted to operate in connection with a pin or projection $O^4$ on said pulley, and mounted on said pulley $O^2$ is a cord, chain, or belt $O^5$, which is also passed around a similar pulley $O^6$, which is mounted on the lower end of a shaft $O^7$, which extends upwardly through the adjacent platform, and is adapted to be operated therefrom.

Connected with the brake-bar C by pivoted arms P is a lever P², one end of which is provided with a pivoted rod P³, which extends longitudinally of the truck, and is pivotally connected with one end of a similar lever P⁴, which is pivotally connected with the brake-bar C² by means of jaws or arms P⁵, and the opposite end of the lever P⁴ is connected with the clutch-sleeve G by a chain, cord, or belt R, which is secured thereto, and one end of the lever P² is also connected with said drum by a chain, cord, or belt R², and the clutch-sleeve G constitutes a drum on which these chains are adapted to be wound.

The operation will be readily understood from the foregoing description when taken in connection with the accompanying drawings and the following statement thereof. It will be understood that the clutch-head D on the axle A is continually revolving therewith, and whenever it is desired to stop the car it is only necessary to operate one of the rods or shafts N⁴ or O⁷ so as to turn the pulleys N and O³ in the direction of the arrow X, and in this operation said wheels will turn until the projections $m^7$ and O⁴ enter the notches or recesses $m^6$ and O³, respectively, in the levers $m^5$ and O. It will be understood that it is only necessary to operate one of these pulleys and either one may be operated and the corresponding lever $m^2$ or $m^3$ will be operated so as to force inwardly the lever K, and this movement of the lever K forces the clutch-sleeve G in the direction of the clutch-head D, and said clutch-sleeve when it comes in contact with said clutch-head is at once revolved, thus winding the chains R and R² thereon, and drawing inwardly the brake-bars C and C², and thus applying the brake-shoes to the wheels $a$.

It will thus be seen that I provide means for applying the usual brake-shoes to the wheels, and also for operating a clutch in connection with one of the axles at the same time, and this device is simple in construction and operation, and perfectly adapted to accomplish the result for which it is intended, and a car provided therewith may be almost instantly stopped.

My invention is not limited to the exact form, construction, and arrangement of the various parts thereof as herein shown and described, and I reserve the right to make all such alterations therein and modifications thereof as fairly come within the scope of the invention.

Having fully described my invention, I claim as new and desire to secure by Letters Patent—

1. The combination with a tramway-car brake, of a clutch mechanism connected with one of the axles thereof, comprising a clutch-head, and a sliding sleeve adapted to operate in connection therewith, said sleeve being revolubly connected with a collar which is also mounted on said axle, and pivotally connected with a lever which is suitably supported transversely of the axle, said lever being pivotally connected at each end with levers which extend in opposite directions, and which are connected by means of pivoted arms, with pulleys each of which is provided with a cord, chain or belt which is also mounted on another pulley which is mounted on or connected with a shaft which is adapted to be operated from the adjacent platform, substantially as shown and described.

2. The combination with a tramway-car, of a clutch mechanism connected with one of the axles thereof, comprising a clutch-head, and a sliding sleeve adapted to operate in connection therewith, said sleeve being revolubly connected with a collar which is also mounted on said axle, and pivotally connected with a lever which is suitably supported transversely of the axle, said lever being pivotally connected at each end with levers which extend in opposite directions, and which are connected by means of pivoted arms, with pulleys each of which is provided with a cord, chain or belt which is also mounted on another pulley which is mounted on or connected with a shaft which is adapted to be operated from the adjacent platform, and suitably-supported brake-bars which extend transversely of the truck, at each end, and are provided with brake-shoes adapted to operate in connection with the wheels, said brake-bars being each provided with a lever, and said levers being connected at one end by a pivoted rod, and at their opposite ends with said clutch-sleeve by means of cords, belts or chains, substantially as shown and described.

3. The combination with the truck of a tramway-car, of suitably-suspended brake-bars, which are provided with brake-shoes which are adapted to operate in connection with the wheels, a lever pivotally connected with each of said brake-bars, one end of each of said levers being connected by means of a pivoted rod, and the other ends being connected by means of cords, belts or chains, with a sliding clutch-sleeve mounted on one of the axles, a clutch-head also mounted on said axle, adjacent to said sleeve and adapted to revolve with the axle, and devices connected with said sleeve for operating the same and said brake-bars, substantially as shown and described.

4. The combination with the truck of a tramway-car, of suitably-suspended brake-bars, which are provided with brake-shoes which are adapted to operate in connection with the wheels, a lever pivotally connected with each of said brake-bars, one end of each of said levers being connected by means of a pivoted rod, and the other ends being connected by means of cords, belts or chains, with a sliding clutch-sleeve, mounted on one of the axles, a clutch-head also mounted on said axle, adjacent to said sleeve and adapted to revolve with the axle, and devices connected with said sleeve for operating the same and said brake-bars, comprising a collar which is connected with said sleeve and in which said sleeve is revolved, said collar being pivotally connected with a lever which, is also mounted on the axle, and said lever being in operative connection at each end with devices which are adapted to be operated from the platform of the car, substantially as shown and described.

In testimony that I claim the foregoing as my invention I have signed my name, in presence of the subscribing witnesses, this 2d day of April, 1896.

JONAS BOWERS PAYNE.

Witnesses:
 CHARLES B. PARTRIDGE,
 OLIVER K. SMITH.